(12) United States Patent
Albrecht et al.

(10) Patent No.: US 7,843,480 B2
(45) Date of Patent: Nov. 30, 2010

(54) IMAGE-RECORDING DEVICE FOR GENERATING A NUMBER OF IMAGE SPOTS IN PROJECTION LINE

(75) Inventors: Uwe Albrecht, Schwedeneck (DE); Bernard Beier, Ladenburg (DE); Uwe Ernst, Mannheim (DE); Peter Goos, Moenkeberg (DE); Andreas Rupprecht, Mauer (DE); Bernd Vosseler, Heidelberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 56 days.

(21) Appl. No.: 10/146,245

(22) Filed: May 15, 2002

(65) Prior Publication Data
US 2003/0026176 A1 Feb. 6, 2003

(30) Foreign Application Priority Data
May 18, 2001 (DE) .............................. 101 24 215

(51) Int. Cl.
*B41J 2/435* (2006.01)
*B41J 2/47* (2006.01)
(52) U.S. Cl. ...................................... 347/234; 347/248
(58) Field of Classification Search ................. 347/116, 347/233–238, 248, 241, 256, 247–250, 128–132, 347/9, 229; 101/467; 358/1.13
See application file for complete search history.

(56) References Cited

U.S. PATENT DOCUMENTS

| | | | |
|---|---|---|---|
| 4,571,602 A | 2/1986 | De Schamphelaere et al. ... | 347/238 |
| 5,163,368 A | 11/1992 | Pensvecchia et al. ........ | 101/136 |
| 5,174,205 A | 12/1992 | Kline et al. ................. | 101/136 |
| 5,274,394 A * | 12/1993 | Corona et al. ................ | 347/237 |
| 5,854,651 A * | 12/1998 | Kessler et al. ............... | 347/241 |
| 5,900,981 A | 5/1999 | Oren et al. ................... | 359/619 |
| 6,035,076 A | 3/2000 | Nagase ........................ | 382/294 |
| 6,044,096 A | 3/2000 | Wolak et al. .................. | 372/36 |
| 6,091,891 A * | 7/2000 | Overall et al. .............. | 358/1.13 |
| 6,141,030 A | 10/2000 | Fujita et al. | |
| 6,201,596 B1 | 3/2001 | Sugita .......................... | 355/41 |
| 6,215,511 B1 * | 4/2001 | Asako et al. ................. | 347/234 |
| 6,390,579 B1 * | 5/2002 | Roylance et al. ............... | 347/9 |
| 6,532,029 B1 * | 3/2003 | Lee ............................. | 347/116 |

(Continued)

FOREIGN PATENT DOCUMENTS

DE 2653539 6/1978

(Continued)

*Primary Examiner*—Hai C Pham
(74) *Attorney, Agent, or Firm*—Davidson, Davidson & Kappel, LLC (57) ABSTRACT

An image-recording device for generating image spots (210) by n individually controllable light sources (12), which each have a distance $s_i$, i being=1 . . . n, to an object line (14), in a projection line (16) of the object line (14) on a printing form (28), which moves with a velocity component v normally to the direction defined by the projection line (16) and tangentially to the surface of the printing form. The image-recording device is distinguished by the triggering device (216) having an assigned time-delay device (222), which delays the tripping instant of the triggering device for each light source (12) as a function of the particular distance $s_i$. The image-recording device may advantageously by used in direct imaging print units or printing-form exposure units.

2 Claims, 5 Drawing Sheets

U.S. PATENT DOCUMENTS

| | | | |
|---|---|---|---|
| 6,603,498 B1 * | 8/2003 | Konnunaho et al. | 347/236 |
| 6,694,880 B1 * | 2/2004 | Mori et al. | 101/467 |
| 6,819,351 B2 * | 11/2004 | O'Hara et al. | 347/237 |

FOREIGN PATENT DOCUMENTS

| | | |
|---|---|---|
| DE | 9302494 | 4/1993 |
| DE | 196 02 307 A1 | 7/1997 |
| DE | 19602307 | 7/1997 |
| EP | 0684133 | 11/1995 |
| JP | 56108185 | 8/1981 |
| JP | 11010949 A * | 1/1999 |

* cited by examiner

IMAGE-RECORDING DEVICE FOR GENERATING A NUMBER OF IMAGE SPOTS IN PROJECTION LINE

Priority to German Patent Application No. 101 24 215.8, filed May 18, 2001 and incorporated by reference herein, is hereby claimed.

BACKGROUND INFORMATION

The present invention is directed to an image-recording device having a number of light sources, which each have a distance $s_i$ to an object line, the index i counting off the light sources, for generating image spots of the light sources in a projection line of the object line on a printing form, which moves at least with a velocity component v normally to the direction defined by the projection line and tangentially to the surface of the printing form, and having a triggering device for switching each individual light source.

To record images on printing forms, which form a plane or curved surface, whether it be in a printing-form exposure unit or in a direct imaging print unit of a printing press, a plurality of light sources, typically lasers, in particular diode laser arrays, are often used. Depending on the image information to be recorded, each individual light source or each individual emitter is switched on, and/or the variables influencing the light intensity are adjusted or preset for each printing dot to be set, so that each individual emitter generates an image spot having a specific light intensity. Frequently, an imaging optics for projecting the light emitted by the light sources onto the printing form is also optionally provided, often with the propagation direction of the light being changed, i.e., with beam formation. To achieve a precise and simple image recording of the printing form using the multiplicity of known image-recording methods, typically when the printing form is accommodated on a so-called printing-form cylinder or printing-plate cylinder, it is desirable for the image spots of the light sources to lie on the printing form in one projection line, in parallel with the cylinder axis. If the image spots are not positioned on one projection line or, in particular, not in parallel with the cylinder axis, image errors can arise on the printing form.

One main reason why the image spots of the light sources do not lie on one projection line on the printing form is that the light sources may, in fact, lie with adequate precision in one object plane, but are not positioned in this plane on one object line. The object line lies in the object plane. In principle, the object line can be a curve in the object plane having curved and straight sections. Without limiting universality, a straight object line is considered in the following. In other words: the individual light sources or emitters each have a distance $s_i$ to an object line, i counting off the individual emitters, at least two light sources having a different distance to the object line. Typically, within the scope of the desired or required precision, this distance is not zero or cannot be disregarded.

This situation often occurs when lasers, in particular diode laser arrays, are used as light sources, which include one or a plurality of semiconductor components on a carrier element. Often, s-shaped or u-shaped deformations of a semiconductor component occur when a soldering process is used to apply the semiconductor component containing the emitter to a plane carrier element, such as a copper heat-sink member. This error, which is conditional upon manufacturing, is also described as the smile effect of the laser diode bar.

From the technical literature, devices are known for reducing or compensating for this smile effect which occurs in laser diode bars. U.S. Pat. No. 5,900,981, for example, describes an optical system for illuminating a spatial light modulator. The laser diode bar has a plurality of light sources, which emit light having different divergence in two mutually orthogonal axes, a so-called slow and a so-called fast axis, and which illuminate an array of microlenses. The array of microlenses collimates the light in the direction of the slow axis. An optical element adjacent to the microlenses refracts the light in the direction of the fast axis. An optical element focuses the emitted light in the direction of the slow axis, at a spatial light modulator, such that the light from each point-like light source irradiates the entire active surface of the spatial light modulator with light. A further optical element is provided which focuses the light in the direction of the fast axis, so that the desired spot size is generated in the direction of the fast axis. The optical system discussed in U.S. Pat. No. 5,900,981 uses natural and/or artificially introduced aberrations to reduce the sensitivity to the smile effect which occurs in most laser diode bars. The drawback associated with the optical system described in this document is the substantial outlay required for adjusting the microlens array.

U.S. Pat. No. 6,044,096 describes a compact laser diode array having reduced asymmetry. It provides for reducing the smile effect of the laser diode bar by allocating a plurality of thermal load elements to the plurality of individual diode light sources. The thermal load elements are similar to the individual laser diode light sources, with the exception that their power output is blocked. Each thermal load element is placed in direct contact with its individual assigned laser diodes, enabling an efficient heat transfer to take place. The operating temperature of the individual laser light source can be changed or adjusted by applying a variable current to the load element. Consequently, the relative position of two laser light sources to one another can be set by applying different currents to their respective, assigned thermal load elements. One disadvantage of using temperature to influence the smile effect is, for example, that the wavelength of the radiation emitted by the laser light source is changed. In addition, fluctuations in the temperature control lead to shifts in the position of the laser diode in relation to the array axis.

To generate image spots, the light sources are switched on and, after a certain time, switched off again. Typically, the emitters are activated by a trigger or tripping signal at a certain tripping instant. It is already known that, since the printing form moves with a velocity component v normally to the principal propagation direction defined by the light emitted from the light source, the image spot of a light source, depending on the tripping instant, is located on the printing form at a position whose coordinates are a function of the tripping instant. This fact is utilized, for example, in the device described in U.S. Pat. No. 5,174,205 for controlling an image-recording device for a printing form, which moves during the image-recording operation in relation to the image-recording device. The image information is stored in a first memory, while correction data for driving the light sources are contained in a second memory. The correction data are utilized to vary the time intervals between image-recording discharges from the light sources, to compensate for deviations between the measured position of the printing form relative to the image-recording head, and the actual position. In addition, U.S. Pat. No. 5,163,368 describes how a correction can be made for each image spot by using its coordinates on the printing form. These coordinate values are stored in a table. Using the correction devices described in these documents, changes in the size of the printing form can be considered in their coordinate directions, and compensated.

In this context, the German Patent Publication No. DE 26 53 539 is also mentioned. It describes the time-delayed triggering of an image-recording device having a number of light sources, whose image spots impinge at an angle on a printing form, thus not in parallel with the coordinate lines of the coordinate system corresponding to the geometry of the printing form. The offset from a coordinate axis caused by the oblique position of the image-recording device, assuming that all light sources are switched on simultaneously, is compensated by a corresponding change in the recording data. However, variably delayed clock pulses, thus trigger or tripping signals, can be applied to the assigned raster computer to compensate for the offset, while the original recording data are retained.

These related-art documents describing delayed triggering start from the assumption that an imaging device having a number of light sources is used to generate image spots on the printing form. These image spots are already situated precisely enough in one projection line on the printing form. At best, therefore, by varying the triggering of individual light sources, one is able to change or influence the position of the image spot on the printing form which moves at least with a velocity component v normally to the principal propagation direction of the direction defined by the light emitted from the light source.

SUMMARY OF THE INVENTION

An object of the present invention is, therefore, to devise an image-recording device for a printing form, to generate a number of image spots such that they are positioned on a projection line of an object line, using a number of light sources, at least two light sources having a different distance to the object line.

The present invention provides an image-recording device having a number of light sources (12), which each have a distance $s_i$ to an object line (14), the index i counting off the light sources (12), for generating image spots (210) of the light sources (12) in a projection line (16) of the object line (14) on a printing form (28). The printing form moves at least with a velocity component v normally to the direction defined by the projection line (16) and tangentially to the surface of the printing form (28). The device has a triggering device (216) for switching each individual light source (12). Assigned to the triggering device (216) is a time-delay device (222), which delays the tripping instant of the triggering device for each light source (12) as a function of the particular distance $s_i$.

The present invention also provides a method for generating image spots (210) from a number of light sources (12), which each exhibit a distance $s_i$ to an object line (14), index i counting off the light sources (12), in the plane defined by the light sources (12), in a projection line (16) of the object line (14) on a printing form (28). The printing form moves at least with a velocity component v normally to the direction defined by the object line (14) and tangentially to the printing form surface. The method comprises the steps of: triggering of a first light source (12) when the projection point comes to rest on the projection line (16) of the object line (14), to generate an image spot; triggering of a second light source (12) with a time delay with respect to the triggering of the first light source (12), such that the corresponding projection point lies on the projection line of the object line, to generate an image spot; and an analogous procedure for each further light source of the number of light sources.

The image-recording device according to the present invention thus includes a number of light sources for generating image spots of the light sources in a projection line on a printing form. The light sources each have a distance $s_i$ to an object line in the object plane defined by the light sources, index i counting off the light sources. For example, in the case of laser light sources on a substrate, the end mirrors of the laser cavity resonators are essentially disposed in one plane and may, thus, define an object plane. Alternatively thereto, an object plane may also be a plane situated spatially behind an imaging optics downstream from the light sources. The projection line includes the points of the printing form on which the image of the object line comes to rest at a first instant on the printing form. The projection line and the object line have a projection ratio k. A projection point of a light source is understood to be that point on the printing form where the light emitted by the light source would fall at a specific instant, if this light source were switched on at this instant in question. An image spot of a light source is understood to be that spot on the printing form where the light emitted by the light source strikes at a specific instant, during the time that the light source is actually switched on.

The printing form moves at least with a velocity component v, normally to the direction defined by the object line and tangentially to the surface of the printing form, at least in the proximity of the projections points of the light sources. Consequently, the projection line, which is defined in the above described manner, moves with the printing form.

A triggering device for switching each individual light source is assigned to the image-recording device. In this context, the switching includes switching on each individual light source, which then emits light with a specific intensity in a specific time interval, and switching off the light source. Triggering is understood in this context to mean that at least the switching-on or initiation action is undertaken. The intensity and illumination duration for one image spot are a function of the data to be recorded. A printing dot is produced by the image spot that is directed across the printing form. Tripping instant is thus the point in time at which the action of the triggering device is initiated.

The device according to the present invention is distinguished by the triggering device of the light sources having an assigned time-delay device, which delays the tripping instant of the triggering device for each light source as a function of the particular distance $s_i$ of the light source to the object line.

Without limiting universality, an advantageous object line is a straight line in the object plane. It is especially advantageous when the light sources are positioned in a semiplane of the object line, which is bounded by the straight line running through the object line.

Expressed in other words, the image-recording device according to the present invention is distinguished by the triggering device having an assigned time-delay device, which switches or triggers each further light source of the number of light sources with a time deviation, relatively to the tripping instant, thus to the instant a first light source, whose projection point comes to rest on the projection line of the object line, is switched on, so that by triggering the first light source, an image spot is generated on the projection line, so that the corresponding or respective image spot is also generated on the projection line of the object line when the corresponding or respective projection point of the other light source lies on the projection line. Typically, the tripping instant of the first light source is defined at or following the first instant which defines the position of the projection line on the printing form.

In other words: a first light source in the image-recording device according to the present invention having a number of light sources is triggered when its projection point comes to rest on the projection line of the object line, so that the corresponding or respective image spot lies on the projection line. The simultaneous triggering of each further light source in the image-recording device would generally lead to each image spot of each further light source not being positioned on the projection line, because, generally, at the tripping instant of the first light source, the projection points do not lie on the projection line of the object line. Since, however, the printing form moves relatively with a velocity component v, normally to the direction defined by the projection line and tangentially to the surface of the printing form, each projection point of each further light source changes its position on the printing form, thus also its position relatively to the printing dot set by the image spot of the first light source on the printing form, i.e., relatively to the projection line of the object line on the printing form defined at the first instant. Once a specific time elapses, each projection point of every other light source passes the projection line, so that the triggering of this light source leads to an image recording by an image spot on the projection line of the object line. Without restricting universality, the time-delayed triggering of the individual light sources in the image-recording device according to the present invention is described as the triggering action that is delayed with respect to the tripping instant of a first light source. This description is based on the notion that, as a first light source, that light source is triggered whose projection point is the first to reach the projection line of the object line due to the relative motion between the image-recording device and the printing form. In this context, an object line is preferably selected for which it holds that all light sources lie in one semiplane of the object plane which is bounded by the straight line running through the object line. To one skilled in the art, it is clear that, when as a first light source, a light source is designated whose image spot only comes to rest on the projection line of the object line subsequent to image spots of a plurality of other light sources of the image-recording device, then a time-advanced triggering is necessary for the plurality of other light sources. In the image-recording device according to the present invention, to trigger an image recording, each trigger signal or control signal is time-delayed for each individual emitter by a delay device or a delay circuit, so that the deviation in the position of the individual light sources to an object line is compensated in the plane defined by the light sources.

The light sources in the image-recording device according to the present invention are preferably lasers, typically an array of diode lasers, in particular a one-dimensional array of diode lasers, set, for example, on a diode laser bar. When it comes to diode laser bars, one main reason the emitters have a non-uniform position relative to an object line, is the so-called smile effect, as described above more closely. The smile effect may be compensated in a simple manner using the image-recording device according to the present invention.

In addition, the image-recording device according to the present invention may include an imaging optics. Preferably, this imaging optics may image objects with a projection ratio k. Beam-forming elements, light-deflecting elements, or light-conducting elements, such as mirrors, light waveguides or the like, or elements for rotating the polarization of the light, may likewise be provided. Typically, the imaging optics includes elements for correcting the divergence or astigmatism of the light sources and/or elements for correcting aberration.

In one preferred specific embodiment, the printing form may be mounted or accommodated on a cylinder. In this instance, the projection line of the object line preferably runs essentially in parallel to the cylinder axis, about which the printing form may be rotated. In addition, the image-recording device may also be movable essentially in parallel to the cylinder axis. The rotational motion about and the translatory motion along the cylinder axis make it possible to reach all relevant points on the printing form provided for the image recording.

One preferred embodiment provides for the printing form to move in a uniform fashion, with a velocity component v, normally to the direction defined by the object line and tangentially to the surface of the printing form. In other words: the velocity component v is essentially constant. This means that, given a projection ratio k, subsequent to the tripping instant of a first light source of the image-recording device according to the present invention, each further light source of the number of light sources is triggered following time $t_i = ks_i/v$, index i counting off the light sources. To one skilled in the art, it is clear that it is sufficient to know the law of motion or the velocity profile, thus the relation between velocity and time, for the relative motion. In this way, even when it is a question of an irregular motion, the necessary delay time $t_i$ may be determined for the i-th light source.

The image-recording device according to the present invention may be used to generate a field of printing dots through rows of image spots, in particular for a field in which adjacent printing dots to be produced exhibit a spacing h. When the distance $s_i$ of a light source is greater than the n-fold distance h/k of adjacent printing dots, n being a natural number and k the projection ratio, the light source in question may be driven using the image information of the printing dot to be produced, which has the smallest distance to the projection line of the object line. The triggering device then switches the light source in question such that, in the delay time interval, points on the printing form have essentially traversed the distance ($ks_i - nh$), k being the projection ratio between the object line and projection line, and n being Int ($s_i k/h$), thus the largest natural multiple of h, for which it holds that n h is less than $s_i k$.

The method according to the present invention for generating image spots from a number of light sources, which each exhibit a distance $s_i$ to an object line, index i counting off the light sources, in the plane defined by the light sources, in a projection line of the object line on a printing form, which is moved at least with a velocity component v normally to the direction defined by the object line and tangentially to the printing form surface, includes, in this context, the following steps. The exposure is triggered by a first light source when its projection point comes to rest on the projection line of the object line. A second light source is triggered with a time delay with respect to the triggering of the first light source such that the corresponding image spot of the second light source lies on the projection line of the object line, thus when the corresponding projection point of the second light source passes the projection line. An analogous procedure is provided for each further light source in the image-recording device having a number of light sources.

The image-recording device according to the present invention and, respectively, the method according to the present invention for generating image spots from a number of light sources renders possible a simple compensation of the smile effect of diode laser arrays, without having to accept a reduction in the beam quality. Using an implementation of the delay device in the form of a programmable logic unit, a very compact type of construction is possible for a large number of emitters, for example greater than 20 individual light sources. The number of emitters or lights sources is advantageously a prime number or a prime power and the spacing between the emitter projection points amounts to a multiple of h, the multiple being prime to the mentioned prime number or prime power.

Especially advantageous is the use of the image-recording device according to the present invention in a printing-form exposure unit or a print unit, in which images are able to be directly recorded on a printing form. A printing press according to the present invention having a feeder, at least one print unit, and a delivery unit, includes at least one print unit having an image-recording device according to the present invention.

BRIEF DESCRIPTION OF THE DRAWINGS

Other advantages, beneficial specific embodiments, and further refinements of the present invention are presented on the basis of the subsequent figures and descriptions thereof, in which.

DETAILED DESCRIPTION

Figure 1:
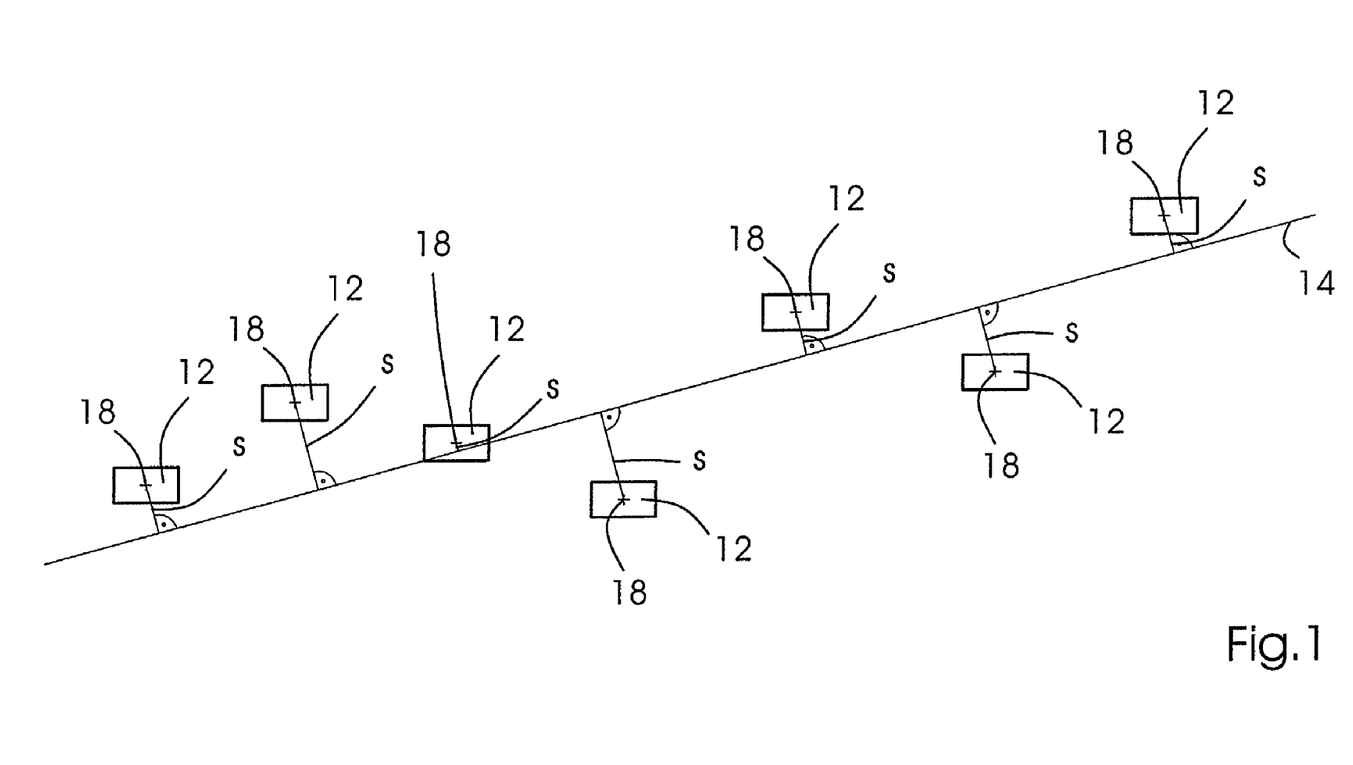
FIG. 1 shows an exemplary schematic for elucidating the position of a number of light sources relative to an object line.

The exemplary sketch shown in FIG. 1 illustrates the position of a number of light sources relative to an object line. By way of example and without limiting universality, FIG. 1 depicts seven light sources 12 and one object line 14. For each light source 12, distance s is understood to be the normal from center point 18 of light source 12 to object line 14. In most cases, object line 14 runs essentially in parallel to a boundary of the emitter surface of light source 12. FIG. 1, however, shows the general case where distances s of the individual light sources likewise vary.

Figure 2:
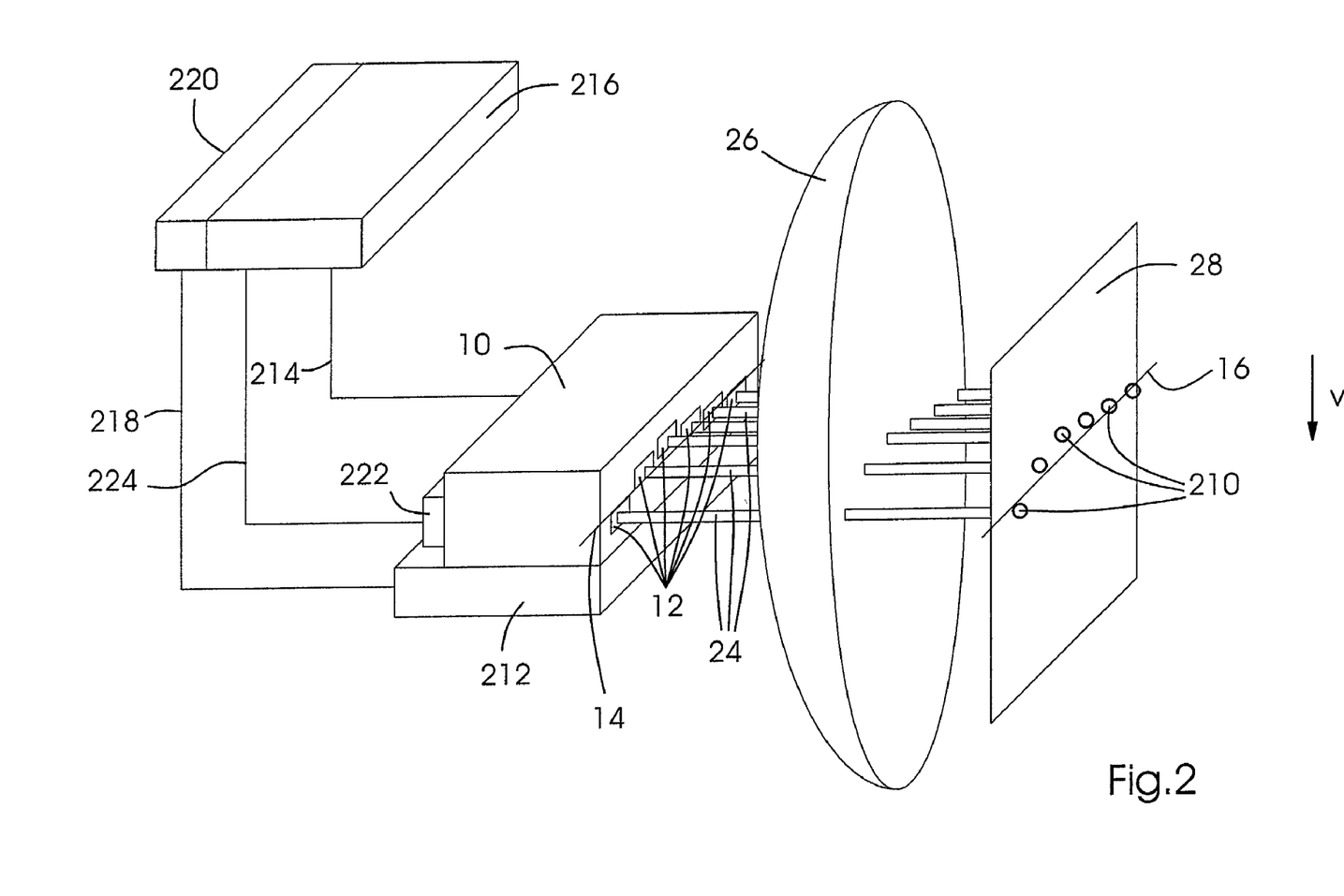
FIG. 2 shows a preferred specific embodiment of the image-recording device according to the present invention having a time-delay device for switching the number of light sources with a time deviation.

FIG. 2 schematically shows a preferred specific embodiment of the image-recording device according to the present invention having a time-delay device for switching individual light sources with a time deviation. Image-recording module 10 is made up of an individually controllable array of a number of light sources 12, typically laser light sources, in particular diode laser arrays. Generally, light sources 12 are not disposed on one object line 14, but rather each have a specific distance to this object line 14. FIG. 2 illustrates exemplarily the general case where not all light sources 12 lie in one semiplane of the object line which is bounded by the straight line running through the object line. Light beams 24 emitted by light sources 12 are imaged by an imaging optics 26 onto image spots 210 on a printing form 28. Image spots 210 generally exhibit an individual distance to a projection line 16, which corresponds to the imaging of object line 14 through imaging optics 26 at a first instant. Ruling out imaging errors of imaging optics 26, the distance of a specific image spot 210 to projection line 16 is proportional to the distance of light source 12 generating image spot 210, to object line 14, the proportionality factor being that of projection ratio k of imaging optics 26.

Light sources 12 in image-recording module 10 may be employed in continuous laser operation. To generate individual light packets, the laser emission is suppressed or interrupted accordingly for a certain time interval. Since printing form 28 moves with a velocity component v relatively to the image-recording device, at least tangentially to the surface of printing form 28, when light sources 12 are all triggered simultaneously, image spots 210 of light sources 12 lie at different tripping instants at different coordinate positions on the surface of printing form 28. Projection line 16 of object line 14 moves with printing form 28.

Imaging optics 26 may have reflective, transmitting, refractive or similar optical components. Preferably, these are micro-optical components, thus components which influence the light emitted by an individual light source 12, while the light from the other light sources 12 remains unaffected by these components. When light sources 12 are lasers, in particular diode lasers, the magnification of the imaging optics 26 may be both enlarging as well as reducing, and also differ in both directions, in parallel and normally to the active zone of the lasers. This is especially beneficial for correcting divergence and/or aberrations. The physical and/or chemical properties of the surface of printing form 28 are modified by the laser radiation, so that, through exposure at a specific intensity and for a certain time interval, image information for a printing dot is written.

In one preferred specific embodiment, image-recording module 10 is situated on a cooling element 212, such as on a copper heat sink traversed by cooling water flow. Image-recording module 10 is linked via a current supply and control line 214 to a triggering device 216. Triggering device 216 has individual components which enable individual light sources 12 of the array to be driven or controlled separately from one another. Cooling element 212 is connected via cooling-element control line 218 to temperature control 220.

The specific embodiment of the image-recording device according to the present invention, as shown in FIG. 2, includes a delay device 222, which is integrated in a compact type of construction with image-recording module 10. Delay device 222 is linked via connection 224 to triggering device 216, thus is allocated thereto. In this context, delay device 222 preferably includes a programmable logic or an ASIC, an application-specific, integrated circuit. In response to the triggering or energizing of a first light source 12, a counter is started with counter start values for each further light source 12 in image-recording module 10. Provision may be made in delay device 222 for the image-recording data for individual light sources 12 to be stored in a memory. For each light source 12, the counter counts back from the start value to zero. Upon reaching the zero value, the corresponding light source 12 is switched on, and the transfer of the corresponding data to this emitter is initiated.

Figure 3:
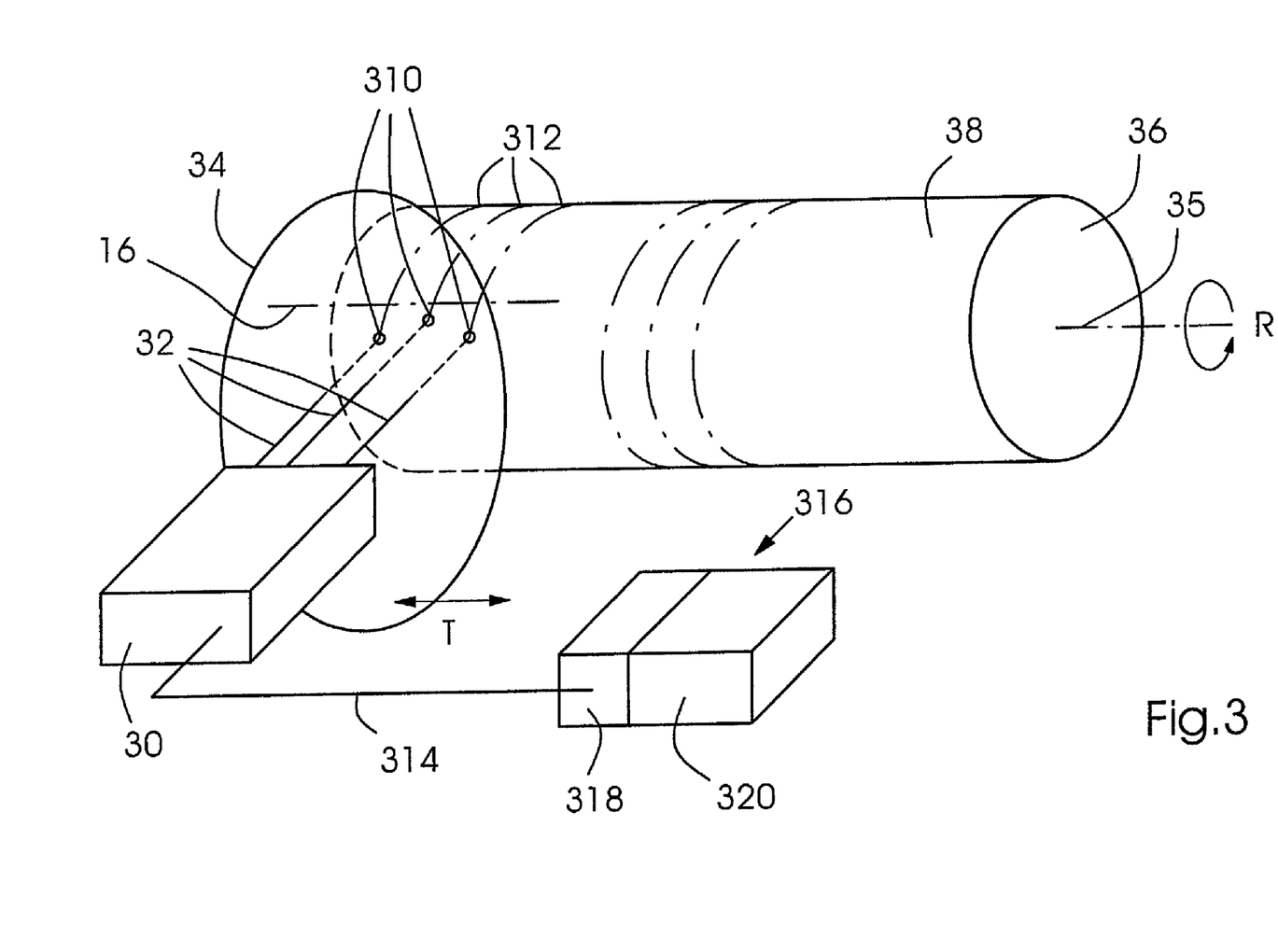
FIG. 3 shows a specific embodiment of the image-recording device according to the present invention having a time-delay device for recording images on a printing form which is accommodated on a rotatable cylinder.

FIG. 3 shows a specific embodiment of the image-recording device according to the present invention, having a time-delay device for recording images on a printing form which is accommodated on a rotatable cylinder. By way of example, image-recording module 30 has three light sources, so that three light beams 32 are produced which are projected by imaging optics 34 at three image spots 310 on printing form 38. The three image spots have an individual distance to a projection line 16. Without restricting universality, a projection line 16 is shown, for which it holds that the three image spots 310 lie in a semiplane of the projection plane which is limited by the straight line running through projection line 16. Printing form 38 is located on a cylinder 36, which is rotatable about its axis of symmetry 35. This rotation is indicated by arrow R. Means not shown in the drawing are provided, so that image-recording module 30 may be moved essentially in parallel to axis of symmetry 35 of cylinder 36 in an essentially linear path, as indicated by double arrow T. For continuous image recording, cylinder 36 rotates along with printing form 38 accommodated thereon, in accordance with rotational motion R, and image-recording module 30 moves with a translational motion along cylinder 36 in accordance with moving direction T. The result is an image recording that encircles axis of symmetry 35 of cylinder 36 on a helical path. The path of projection points, i.e., of image spots 310 is indicated by lines 310. In other words: once three points are recorded, as shown here for example, a relative displacement of printing form 38 and of image spots 310 follows with a vector component that is normal to the direction defined by projection line 18, by a specific amount, so that, again here by way of example, three points are written at another position of printing form 38. In this manner, so-called raster scan lines of image spots are formed. Image-recording module 30 is linked by a connection 314 to a control unit 316. In this specific embodiment, control unit 316 includes a delay device 318 and a triggering device 320.

On the basis of an example and without limiting universality, FIGS. 4, 5, 6, and 7 clarify how the image-recording device according to the present invention is used to generate printing dots through image spots on the projection line or a field of printing dots by rows, by employing a number of light sources, which each have a distance $s_i$ to an object line in the plane defined by the light sources, index i counting off the light sources, to generate image spots of the light sources in a projection line of the object line on a printing form, which move at least with a velocity component v, normally to the direction defined by the object line and tangentially to the surface of the printing form.

Figure 4:
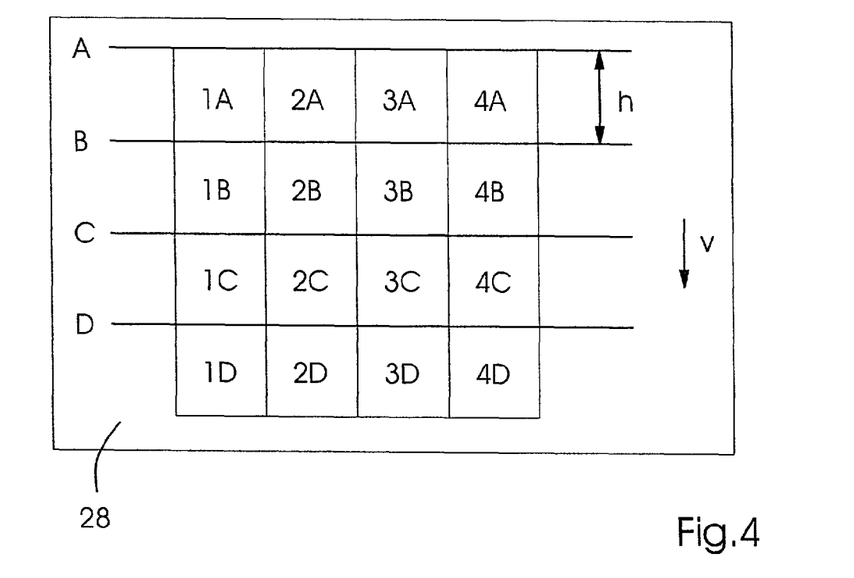
FIG. 4 shows an exemplary sketch for elucidating the notation used with respect to the position of the printing dots to be recorded on a printing form.

FIG. 4 is an exemplary sketch for elucidating the notation used with respect to the position of the printing dots to be written on a printing form 28. Without limiting universality, FIG. 4 assumes four emitters or light sources, which, by way of example, produce here a field of 4×4 printing dots by image spots of the light sources on the printing form. Here, it is assumed by way of example that a regular Cartesian field is to be written. However, other patterns of printing dots to be imaged are also conceivable. The extent of one printing dot or the distance between adjacent printing dots, measured from one center point to the next center point, is denoted by h. For the sake of simplicity, the printing dots are represented as squares; the actual form is determined by the form of the imaging light beam, i.e., by its process parameters, such as intensity, exposure time, relative speed between the printing form and the imaging light beam and the like. The printing dots in the field are designated by a number-letter combination: the number corresponds to the index which counts off the individual light sources, in particular lasers, while, in alphabetical order, the letter counts off the image-recording steps that follow one another chronologically. FIG. 4 shows a first projection line A, a second projection line B, a third projection line C, and a fourth projection line D, which pass the projection points of the four emitters or light sources (not shown here) one after another in time succession, when the printing form moves with a velocity component v in the arrow direction relatively to the image-recording module containing the light sources. When the projection point of a first light source or of a first emitter comes to rest on first projection line A, a trigger or switching signal for initiating the image recording by the image spot is generated, so that a printing dot is set.

Figure 5:
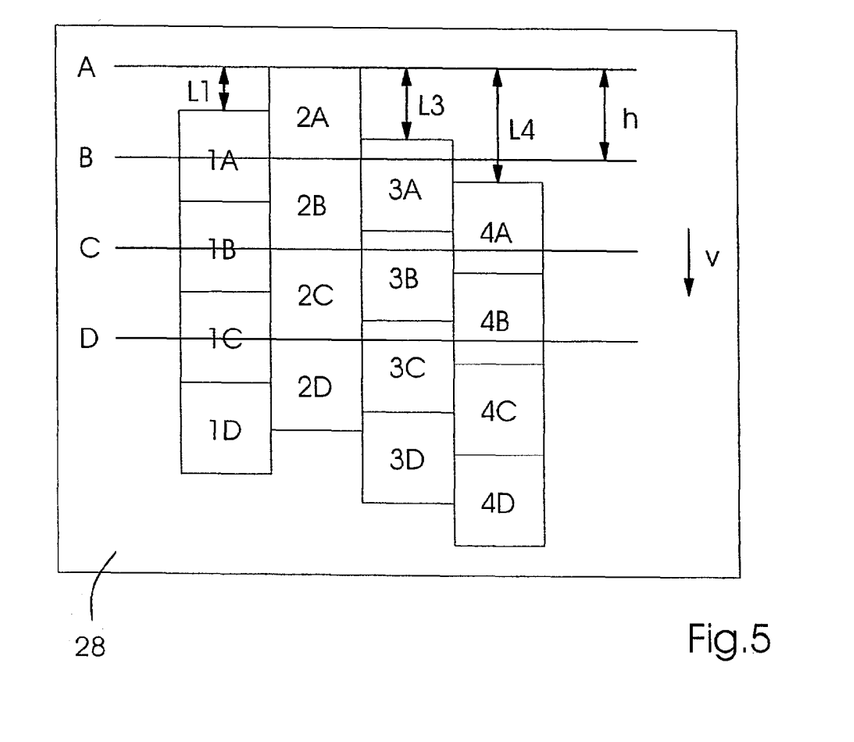
FIG. 5 shows a schematic representation of an exemplary position of image spots, without compensation by the time-delay device of the image-recording device according to the present invention on the printing form.

A schematic representation of an exemplary position of image spots is shown in FIG. 5, with compensation on printing form 28 by the time-delay device of the image-recording device according to the present invention. By way of example, without limiting universality, the projection point of the second light source is the first to pass first projection line A. When all the light sources are triggered at the same time, then, because of the individual distance of each light source to an object line in the plane defined by the light sources, the image spots of the other light sources are positioned such that they are displaced or offset in comparison to the starting edge of image spot 2A. The image spots generated by the first light source exhibit, for example, a first offset L1; the image spots generated by the third light source, a third offset L3; and the image spots generated by the fourth light source, a fourth offset L4. FIG. 5 illustrates exemplarily that the image spots of the fourth light source lie distant by more than one printing dot length h from the corresponding projection line.

Figure 6:
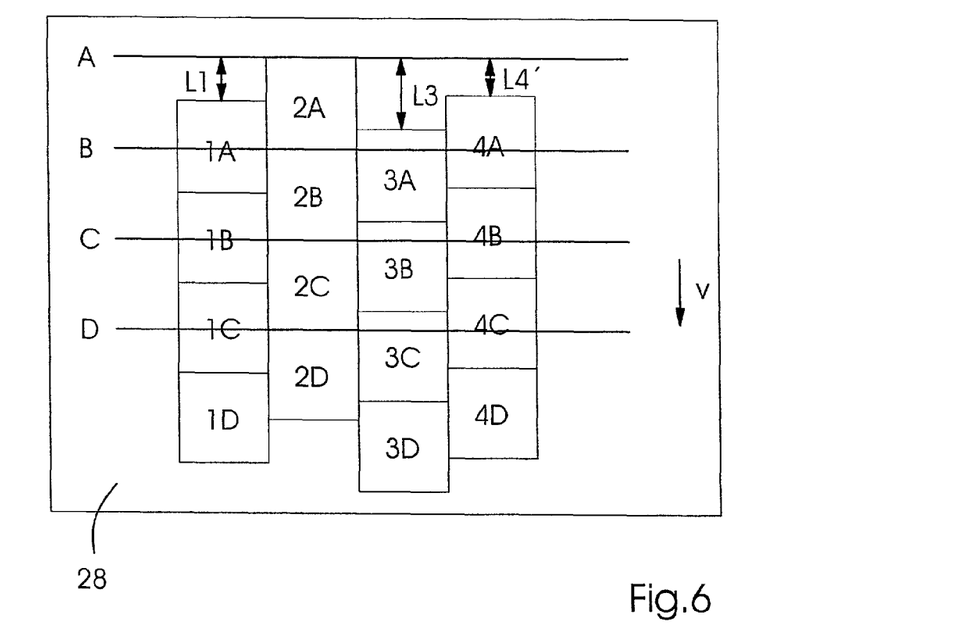
FIG. 6 shows a schematic representation of the exemplary position of image spots, without compensation by varying the triggering over time of those image spots, whose distance is greater than the print dot distance.

FIG. 6 is a schematic representation of the exemplary position of image spots, without compensation on printing form 28 by varied triggering of the light sources having those projection points or image spots whose distance is greater than the printing dot distance. To reduce the positional deviation which is greater than an image spot length h, the triggering of the corresponding light source may be advanced by n image-recording steps, n being that natural number for which it holds that (L4−nh) is minimal, but positive, thus n=INT(L4/h). For the example shown in FIG. 6, this means that printing dot 4A is set by the fourth light source in response to the switching signal that corresponds to the passing of first projection line A, and printing dot 4B corresponds to printing dot 4A from FIG. 5. Analogously, positional deviations which are greater than two image spot lengths h, are compensated in that the two image-recording steps are shifted in time in accordance with the data. Using this procedure of shifting of data, all positional deviations may be made smaller than one image spot length h. By way of example in FIG. 6, the distance of the fourth image spot is reduced to the fourth remaining offset L4', in other words, in this case, L4' corresponding to the division remainder (L4 mod h).

Figure 7:
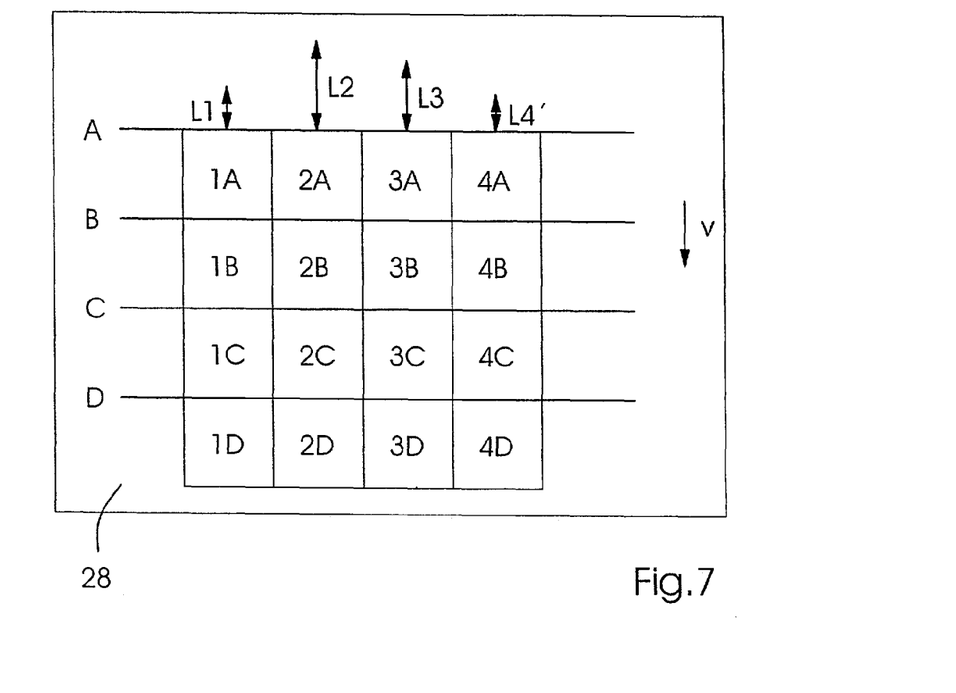
FIG. 7 shows a schematic representation of the position of image spots with compensation by delayed triggering of the light sources.

FIG. 7 is a schematic representation of the position of image spots, with compensation by delayed triggering of the light sources following a triggering instant of a first light source considered over time, here, for example, of the second light source. To reduce positional deviations which are smaller than an image spot length h, the data transfer and the triggering of the light source following a tripping instant of a first light source, may be delayed. Delayed tripping instants are defined on an individual basis, differently for each light source, by the trigger signal corresponding to the projection point of the second light source passing first projection line A in such a way that the image spots of the light sources for generating printing dots come to rest on first projection line A. For example, the first light source is thus triggered following the triggering of the second light source at instant $t_1$=L1/v. Delayed tripping signals are generated in analogous fashion for the other light sources: for the third light source $t_3$=L3/v and for the fourth light source $t_4$=L4'/v, following the tripping instant of the second light source. In conclusion, the desired field of printing dots is generated by iteration for each further projection line, as shown in FIG. 4.

It should still be mentioned that, when generating delayed tripping signals, the delay device should be operated with a signal frequency that is a multiple of the frequency of the original triggering signal. The offset through delayed triggering is achieved by the delay device, which, for example, has a programmable logic unit, an ASIC, a discrete electronics or the like. Distances $s_i$, index i counting off the light sources, and projection ratio k between the object line and projection line are made available to the delay electronics, in suitable form, for example as stored data in a memory unit. From this data, and from velocity component v of the relative motion between the printing form and image-recording device, given a known velocity profile of the printing form, for example of a uniform motion, the delay device may determine start values for counters which are each assigned to a light source. Given a fixed clock frequency of the delay device, depending on the counter start value, a specific time interval elapses until the counter counts back to zero, so that a delayed triggering of the control of the corresponding light source is able to be initiated upon reaching the zero value of the counter.

For an image-recording device having a number of light sources which lie in an object plane, distances $s_i$ to an object line in the object plane, index i counting off the light sources, may be determined within the scope of a calibration or measurement. In this context, it is clear that, using simple arithmetic, distances $s_i$ of the light sources to a first object line may be converted into distances to a second object line.

The image-recording device in accordance with the present invention may provide images at a form cylinder in a print unit. A cylinder of this kind may constitute part of a printing press, for example as a substitute for the form cylinder in a print unit of the printing press in U.S. Pat. No. 6,318,264, which is hereby incorporated by reference herein.

| Reference Symbol List | |
|---|---|
| 10 | image-recording module |
| 12 | light source |
| 14 | object line |
| 16 | projection line |
| 18 | center point |
| 24 | light beam |
| 26 | imaging optics |
| 28 | printing form |
| 210 | image spot |
| 212 | cooling element |
| 214 | line to current supply and control |
| 216 | triggering device |
| 218 | line to temperature control |
| 220 | temperature control |
| 222 | delay device |
| 224 | connection to control |
| 30 | image-recording module |
| 32 | laser beam |
| 34 | imaging optics |
| 35 | axis of symmetry |
| 36 | cylinder |
| 38 | printing form |
| 310 | image spots |
| 312 | path of image spots |
| 314 | connection to control unit |
| 316 | control unit |
| 318 | delay device |
| 320 | triggering device |
| k | projection ratio |
| s | distance to object line |
| h | printing dot distance |
| v | velocity component |
| A | first projection line |

| -continued | |
|---|---|
| Reference Symbol List | |
| B | second projection line |
| C | third projection line |
| D | fourth projection line |
| L1 | first offset |
| L3 | third offset |
| L4 | fourth offset |
| L4' | fourth remaining offset |

What is claimed is:

1. An image-recording device comprising:
a diode laser bar having a plurality of diode laser light sources for generating image spots in a projection line on a printing form of an object line, each light source having a distance $s_i$ to the object line, index i counting off each light source of the plurality of light sources, the printing form moving at least with a velocity component v normally to a direction defined by the projection line and tangentially to a surface of the printing form;
a triggering device for switching each light source of the plurality of light sources; and
a time-delay device assigned to the triggering device, the time-delay device delaying a tripping instant of the triggering device for each light source as a function of the distance $s_i$;
wherein the plurality of light sources generates a field of printing dots through rows of image spots, adjacent printing dots to be produced exhibiting a spacing h, a first light source of the plurality of light sources for generating a first projection point, a distance of the first projection point from the projection line being greater than h, the triggering device setting the triggering of the first light source as a function of the spacing h and a natural number n so that the projection point has another distance within spacing h to the projection line, the time-delay device delaying switching of the first light source so that the projection point on the printing form generated by the first light source traverses the distance $(ks_i-nh)$, k being a projection ratio between the object line and the projection line.

2. A method for generating image spots from a diode laser bar having a plurality of diode laser light sources, each light source being at a distance $s_i$ from an object line, index i counting off the light sources, in a projection line of the object line on a printing form, the printing form moving at least with a velocity component v normally to a direction defined by the object line and tangentially to a surface of the printing form, the method comprising the steps of:
triggering a first light source when a projection point of the first light source reaches the projection line so as to generate an image spot;
triggering a further light source with a time delay with respect to the triggering of the first light source, such that a corresponding further projection point after the time delay lies on the projection line of the object line, to generate a further image spot; and
repeating the triggering for each other light source of the plurality of light sources;
wherein the plurality of light sources generates a field of printing dots through rows of image spots, adjacent printing dots to be produced exhibiting a spacing h, a distance of the further projection point from the projection line being greater than h, the triggering of the further light source being a function of the spacing h and a natural number n so that the further projection point has another distance within spacing h to the projection line, the time delay being such that the further projection point on the printing form generated by the further light source traverses the distance $(ks_i-nh)$, k being a projection ratio between the object line and the projection line.

* * * * *